(12) United States Patent
He

(10) Patent No.: US 11,064,341 B2
(45) Date of Patent: Jul. 13, 2021

(54) METHOD AND DEVICE FOR NOTIFICATION OF INFORMATION ABOUT RAN-BASED NOTIFICATION AREA

(71) Applicant: ZTE CORPORATION, Guangdong (KR)

(72) Inventor: Meifang He, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/504,211

(22) Filed: Jul. 5, 2019

(65) Prior Publication Data

US 2019/0335314 A1      Oct. 31, 2019

Related U.S. Application Data

(63) Continuation of application No. PCT/CN2017/120361, filed on Dec. 29, 2017.

(30) Foreign Application Priority Data

Jan. 6, 2017   (CN) .......................... 201710010726.7

(51) Int. Cl.
*H04W 8/08*       (2009.01)
*H04W 68/00*      (2009.01)

(52) U.S. Cl.
CPC ........... *H04W 8/08* (2013.01); *H04W 68/005* (2013.01)

(58) Field of Classification Search
CPC ... H04W 76/27; H04W 68/005; H04W 60/00; H04W 68/02; H04W 48/20; H04W 60/04; H04W 68/00; H04W 8/08
See application file for complete search history.

(56) References Cited

U.S. PATENT DOCUMENTS

| 8,032,159 | B2 | 10/2011 | Wu et al. |
| 10,051,529 | B2 | 8/2018 | Fu et al. |
| 2009/0213762 | A1 | 8/2009 | Guo et al. |
| 2016/0037417 | A1* | 2/2016 | Xing ..................... H04W 80/00 455/436 |

(Continued)

FOREIGN PATENT DOCUMENTS

| CN | 101043698 A | 9/2007 |
| CN | 103916917 A | 7/2014 |

(Continued)

OTHER PUBLICATIONS

International Search Report and Written Opinion for International Appl. No. PCT/CN2017/120361, dated Mar. 30, 2018.

(Continued)

*Primary Examiner* — Jung H Park
(74) *Attorney, Agent, or Firm* — Foley & Lardner LLP

(57) ABSTRACT

Disclosed is a method and device for the notification of information about an RAN-based notification area, comprising: a network side node determines RNA information about an RAN notification area according to a preset policy; the network side node sends the determined RNA information to a terminal. The policy comprises one of the following: representing the RNA information using a mode configured by a network side; or determining a representation mode of the RNA information according to related information of the terminal.

11 Claims, 5 Drawing Sheets

(56) References Cited

U.S. PATENT DOCUMENTS

| | | | | |
|---|---|---|---|---|
| 2018/0234890 | A1* | 8/2018 | Shih | H04W 36/0005 |
| 2018/0270787 | A1* | 9/2018 | Drevon | H04W 36/385 |
| 2019/0174571 | A1* | 6/2019 | Deenoo | H04W 36/30 |
| 2019/0239188 | A1* | 8/2019 | Wang | H04W 92/10 |
| 2019/0261447 | A1* | 8/2019 | Fujishiro | H04W 76/27 |
| 2019/0289570 | A1* | 9/2019 | Kim | H04W 76/27 |

FOREIGN PATENT DOCUMENTS

| | | |
|---|---|---|
| CN | 106879009 A | 6/2017 |
| JP | 2020-505811 A | 2/2020 |
| WO | WO-2013/109080 A1 | 7/2013 |
| WO | WO-2017/184837 A1 | 10/2017 |
| WO | WO-2018/062499 A1 | 4/2018 |

OTHER PUBLICATIONS

"Text Proposal to TR 38.804 on UE states and state transitions for NR", NTT DOCOMO, Inc., 3GPP TSG-RAN WG2 # 96, R2-168856, Nov. 30, 2016 (4 pages).

"Discussion on RAN controlled UE state", CATT, 3GPP TSG RAN WG3 Meeting # 93, R3-161688, Aug. 12, 2016 (6 pages).

"Discussion on RAN notification area for the new RRC state", Intel Corporation, 3GPP TSG-RAN WG2 # 96, R2-168524, Nov. 5, 2016 (3 pages).

"RAN based update mechanism for new RAN state", Intel Corporation, 3GPP TSG RAN WG2 Meeting 6, R2-168525, Nov. 5, 2016 (2 pages).

Extended European Search Report on EP 17889562.9 dated Nov. 27, 2019 (8 pages).

First Chinese Office Action on CN 201710010726.7 dated Dec. 17, 2019 (with English translation thereof; 24 pages).

Second Chinese Office Action on CN 2017100107267 dated Mar. 27, 2020 (22 pages).

First Korean Office Action on KR 10-2019-7022610 dated Aug. 20, 2020 (4 pages).

Intel Corporation: "Discussion on RAN notification area for the new RRC state", 3GPP TSG RAN WG2 Meeting #95bis, R2-166881, Oct. 14, 2016, Kaohsiung (3 pages).

Third Chinese Office Action on CN 2017100107267 dated Jun. 16, 2020 (20 pages, with English translation).

Indian Search Report for in Appl. No. 201937030368, dated Feb. 24, 2021 (6 pages).

Ericsson: "Signalling flows for paging and resume for inactive state" [online], 3GPP TSG RAN WG2 #96 R2-168712, Nov. 18, 2016, Reno, USA (8 pages) Internet <URL: http://www.3gpp.org/ftp/tsg_ran/WG2_RL2/TSGR2_96/Docs/R2-168712.zip>.

First Office Action for JP Appl. No. 2019-536972, dated Oct. 19, 2020. (with English translation, 11 pages).

* cited by examiner

METHOD AND DEVICE FOR NOTIFICATION OF INFORMATION ABOUT RAN-BASED NOTIFICATION AREA

CROSS-REFERENCE TO RELATED APPLICATIONS

This application is a continuation of International Application No. PCT/CN2017/120361, filed Dec. 29, 2017, which claims the benefit of and priority to Chinese Patent Application No. 201710010726.7, filed Jan. 6, 2017, the entire contents of both of which are incorporated herein by reference.

TECHNICAL FIELD

The present disclosure relates to the field of mobile communications and, for example, to a method and a device for notifying RAN based notification area information.

BACKGROUND

With increasingly more transmission services with small data volumes, such as keep-alive services and services of machine type communication (MTC) equipment, an inactive state is introduced in relevant technology to reduce power consumption and signaling overheads. In the inactive state, the user equipment (UE) is allowed to move within a certain area notified by the radio access network (RAN) and does not need to report to the core network. In this case, the RAN needs to initiate a paging procedure to page the UE in response to downlink data, a downlink signaling or a non-access stratum (NAS) message. To support the paging procedure, RAN based notification area (RNA) information needs to be configured to a terminal so that the terminal can move within the RNA without reporting to a network side. In case of moving out of the RNA, the terminal needs to be sensed by the network side.

If the terminal cannot learn of the RNA information, the terminal will report to the network side as long as it moves even in the inactive state, which inevitably causes unnecessary frequent signaling between UE and network and wastes system resources.

SUMMARY

The present disclosure provides a method and a device for notifying RAN based notification area (RNA) information to eliminate unnecessary frequent signaling between UE and network, thereby saving system resources.

The present disclosure provides a method for notifying RNA information. The method includes steps described below.

A network side node determines RNA information according to a preset strategy.

The network side node transmits the determined RNA information to a terminal.

The strategy includes one of: representing the RNA information in a manner configured at a network side; or determining a manner for representing the RNA information according to information related to the terminal.

The present disclosure further provides a device for notifying RNA information. The device includes a determination module and a notification module.

The determination module is configured to determine RNA information according to a preset strategy.

The notification module is configured to transmit the determined RNA information to a terminal.

The strategy includes one of: representing the RNA information in a manner configured at a network side; or determining a manner for representing the RNA information according to information related to the terminal.

The present disclosure provides the method and the device for notifying RNA information in which the RNA information is notified to the terminal, thereby eliminating unnecessary frequent signaling between UE and network and saving system resources. In a case that the strategy includes multiple manners for representing the RNA information, the RNA information may be determined based on the information related to the terminal such as a service characteristic or a movement characteristic, thereby optimizing the RNA information.

DETAILED DESCRIPTION

The industry has reached a consensus on composition of RNA information, for example, one piece of RNA information may include information on one or multiple cells, where the multiple cells may belong to different base stations. One RNA may be smaller than one tracking area (TA). However, content on specific composition of the RNA information has not been provided.

A new identifier, such as an RAN tracking area (RTA) identifier, may be introduced so that the RNA information may be represented by an RTA list. Alternatively, the RNA information may be represented by one TA or one cell list.

Figure 1:
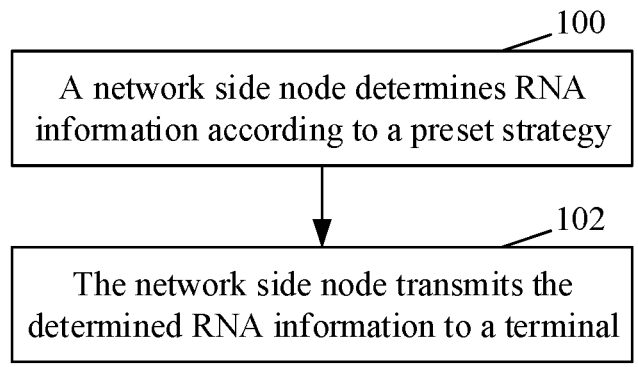
FIG. 1 is a flowchart of a method for notifying RNA information according to an embodiment.

FIG. 1 is a flowchart of a method for notifying RNA information according to an embodiment of the present disclosure. As shown in FIG. 1, the method may include steps described below.

In step 100, a network side node determines RNA information according to a preset strategy.

An RNA is an area where a UE can move without reporting to a network side. For example, the UE may perform a mechanism similar to a cell reselection mechanism under an idle state in a Long Term Evolution (LTE) system.

The preset strategy includes representing the RNA information in a default manner, that is, representing the RNA information in a manner configured at a network side.

Alternatively, the preset strategy includes determining a manner for representing the RNA information according to information related to a terminal.

The information related to the terminal may include at least one of: a service characteristic, a movement characteristic and the like. The network side node may be an RAN node such as a base station and the base station may be an eNB, a gNB in 5 G or the like.

Optionally, in a case that the strategy is represented by the RNA information in the default manner, a step in which the network side node transmits the determined RNA information to the terminal includes: representing, by the network side node, the RNA information by using at least one of: RTA information, cell information and TA information by default.

If the default manner is not configured at the network side, the terminal reports an exception. In this case, the terminal in an inactive state by default supports representing the RNA information with at least one of the RTA information, the cell information and the TA information.

Alternatively, in a case that the network side node by default represents the RNA information by using at least one of the RTA information and the cell information and such strategy is not configured at the network side, the RNA information is represented by the TA information by default.

Optionally, in a case that the strategy includes representing the RNA information by using the RTA information and the cell information, the network side may determine to represent the RNA information with one of the RTA information and the cell information according to the information related to the terminal such as at least one of the service characteristic, the movement characteristic and the like.

Optionally, the service characteristic of the terminal, that is, of the UE, includes at least one of a delay requirement, a reliability requirement and a rate requirement. For example, the RNA information of different area levels may be configured for different service characteristics of the terminal, which include at least one of a narrowband Internet of things (NB-IoT) service, an ultra reliable low latency service and an enhanced mobile broadband (eMBB) service. For example, for the NB-IoT service and the ultra reliable low latency service, the RNA information may be represented with information about a small area, such as the cell information. For example, for the eMBB service, the RNA information may be represented with information about a wide area, such as the RTA information or the TA information.

Optionally, the movement characteristic of the UE includes movement trajectory information of the UE, and the network side node, such as the base station, may estimate a smaller paging area within a TA list according to the movement trajectory information of the UE, and determine a base station list in the smaller paging area. That is to say, for a currently configured paging area, the smaller paging area is determined by optimizing the RNA information. For example, assuming that the paging area of the UE notified by the base station includes Cell1, Cell2 and Cell3, an early paging area may be a currently registered cell, e.g., Cell1, according to the movement characteristic such as a low speed of the UE.

Optionally, the strategy may be that the network side node determines the manner for representing the RNA information according to a received manner for representing the RNA information that is supported by the terminal and reported by the terminal.

For example, the network side node receives the manner for representing the RNA information supported by the terminal and reported by the terminal, and configures the RNA information of the terminal in the inactive state according to the manner for representing the RNA information supported by the terminal.

The cell information may include information on a cell or UE specific cell list. Range information of the UE specific cell list includes at least one of the following: multiple cells belong to one or multiple base stations, and multiple cells belong to one or multiple TAs.

The RTA information may include information on an RTA or UE specific RTA list.

The TA information may include information on a TA or TA list.

Optionally, the manner for representing the RNA supported by the terminal includes at least one of: representing the RNA information by using the RTA information; representing the RNA information by using the cell information; and representing the RNA information by using the TA information.

Optionally, the RNA information may satisfy one of the following:
one cell belongs to one RTA;
one cell belongs to multiple RTAs for different services;
one RTA may include one or multiple cells;
the multiple cells included in one RTA may belong to one or multiple base stations;
the multiple cells included in one RTA may belong to one or multiple TAs; and
the multiple cells included in one RTA should be in one TA list.

Optionally, in a case that the strategy includes multiple manners for representing the RNA information, one manner may be determined, according to the information related to the terminal such as at least one of the service characteristic, the movement characteristic and the like, to represent the RNA information.

In step 102, the network side node transmits the determined RNA information to the terminal.

For example, the network side node transmits an inactive indication and the determined RNA information to the terminal.

The network side node such as the base station may transmit the determined RNA information to the terminal through a downlink air interface message.

The downlink air interface message may include, but is not limited to, a common message, a dedicated message and the like.

The embodiment provides a complete solution for notifying the terminal of the RNA information, eliminating unnecessary frequent signaling between UE and network and thus saving system resources.

When the strategy includes multiple manners for representing the RNA information, a preferred information representation manner may be determined to represent the RNA information based on the information related to the terminal such as at least one of the service characteristic, the movement characteristic and the like, thereby optimizing the RNA information.

Optionally, if the RNA information transmitted by the network side node is represented in multiple manners, the terminal may further determine one of the multiple manners to represent the RNA information according to the information related to the terminal such as at least one of the service characteristic, the movement characteristic and the like.

Figure 3:
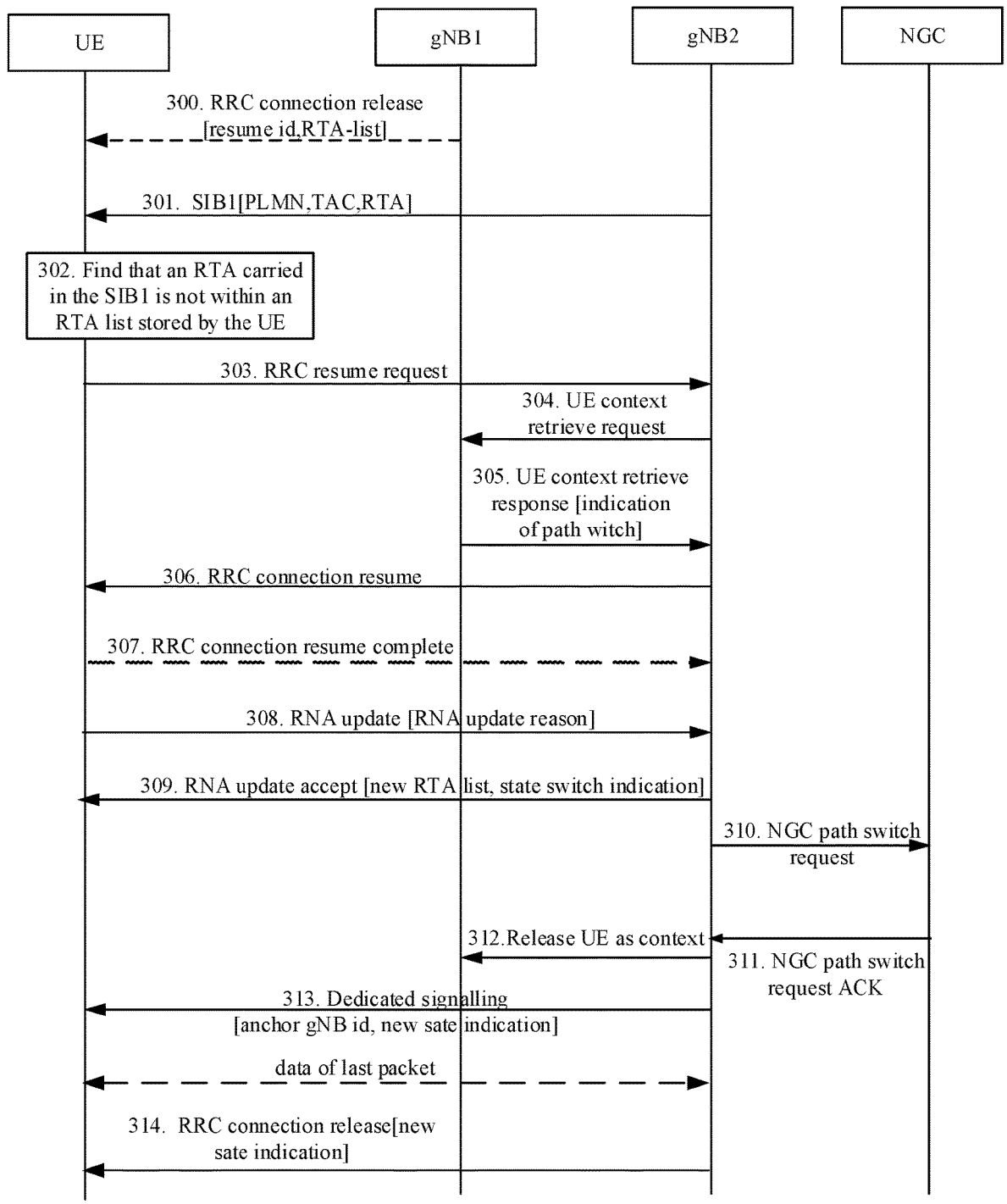
FIG. 3 is a flowchart of an update of RNA information according to an embodiment.
Figure 4:
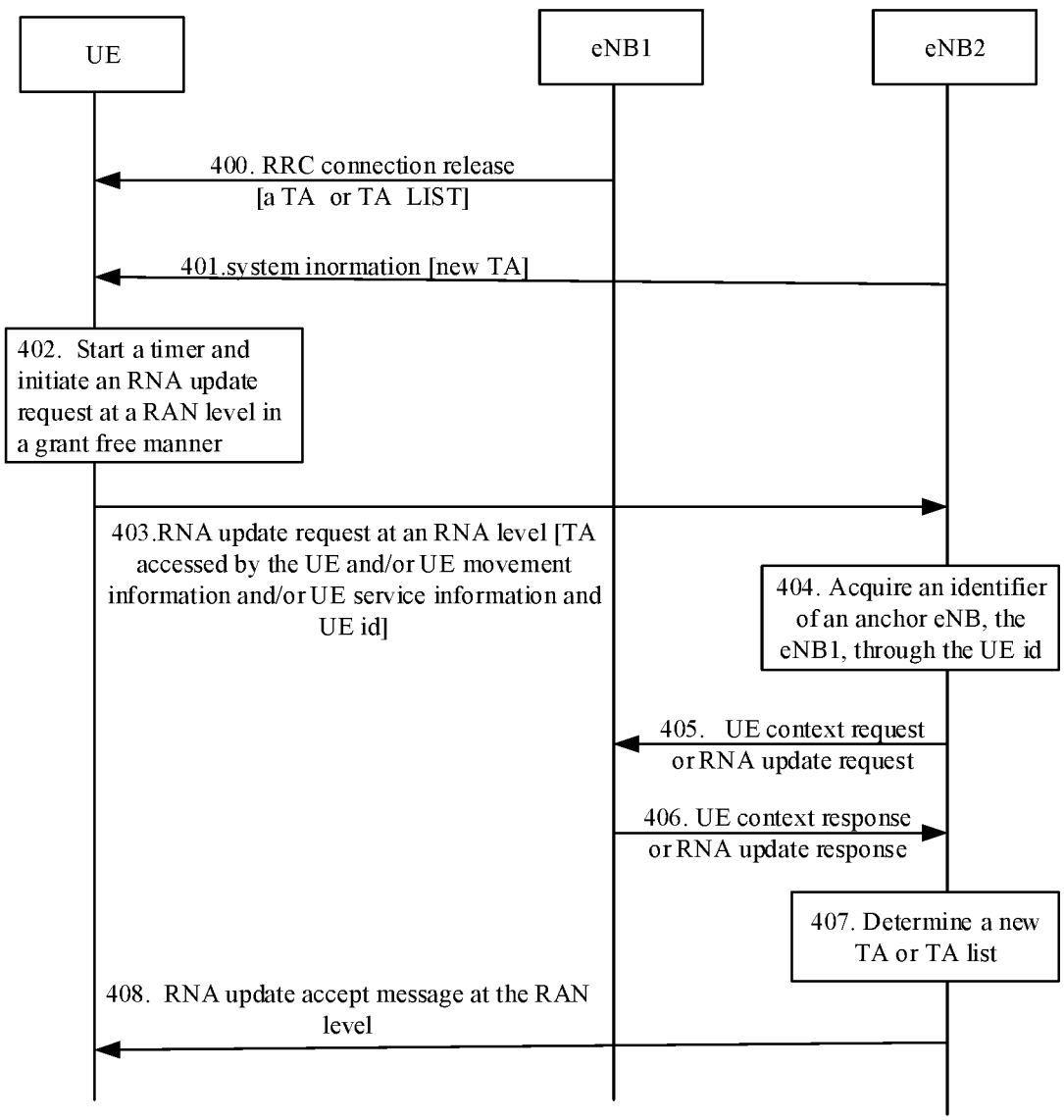
FIG. 4 is a flowchart of another update of RNA information according to an embodiment.
Figure 5:
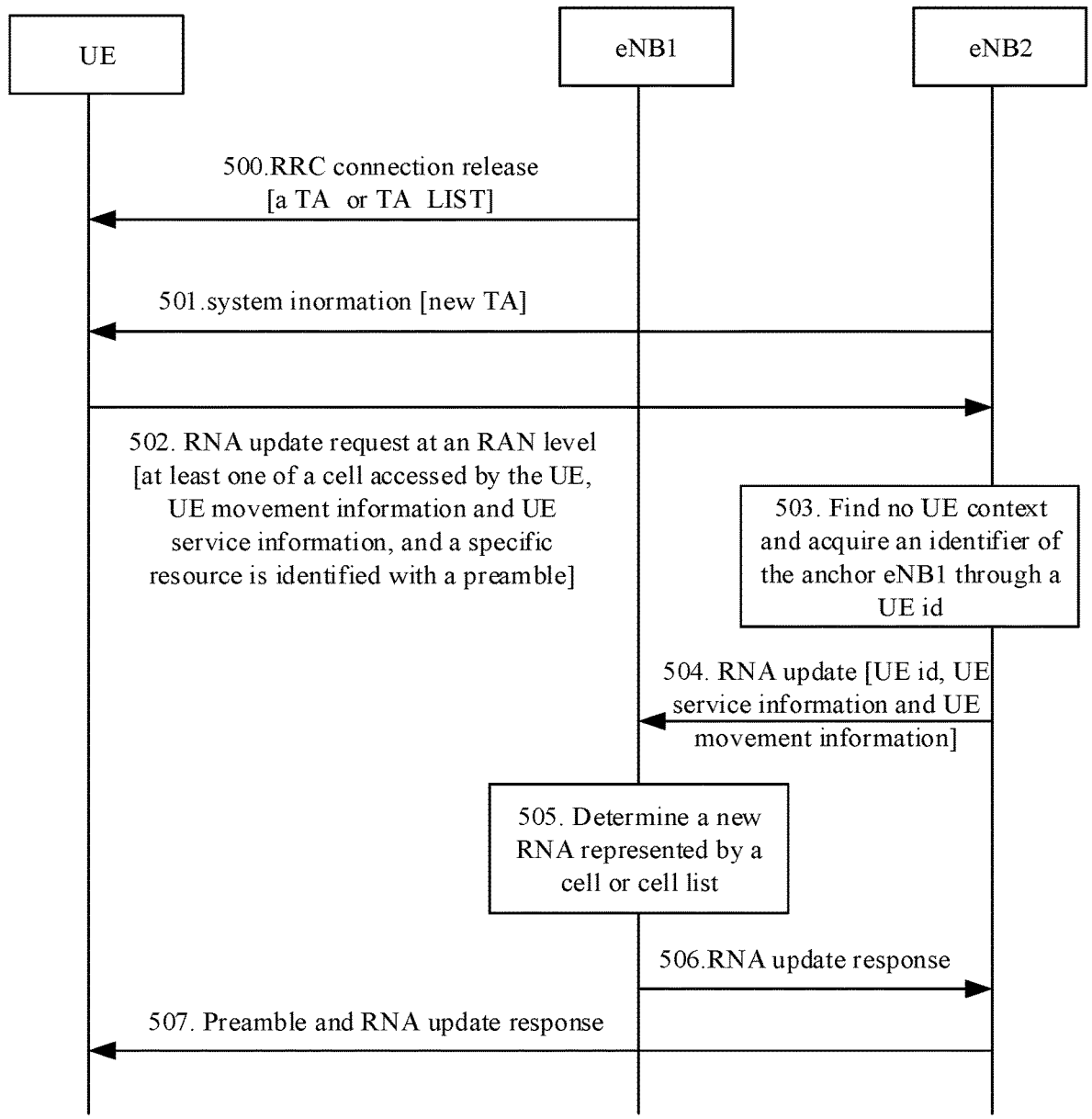
FIG. 5 is a flowchart of yet another update of RNA information according to an embodiment.

In a case that the terminal finds that it enters into a new RNA, the method in an embodiment further includes that the terminal initiates a RAN-side RNA update procedure, which may include one of the three types described below:

an RNA update procedure where the RNA information is represented by the RTA information, which may be understood with reference to FIG. 3; an RNA update procedure where the RNA information is represented by the TA information, which may be understood with reference to FIG. 4;

and an RNA update procedure where the RNA information is represented by the cell information, which may be understood with reference to FIG. 5.

The method in an embodiment further includes optimizing an RAN paging.

In a case that both the network side node and the terminal support representing the RNA information by using cell information, and downlink data, a next generation network control surface (NGC) interface signaling or a NAS signaling from a core network arrives, the RAN paging is implemented in a cell included in the cell information. That is, in a case that the network side receives data, the NGC interface signaling or the NAS signaling from the core network, the RAN node performs paging in the RNA. Here RNA refers to an area of a cell corresponding to the RNA information. In response to a paging timeout, the RAN paging may be performed in a TA indicated by the RTA information or the TA information. The TA indicated by the RTA information or the TA information is determined by a movement trajectory of the terminal. An NGC interface may be a control plane interface between the core network and the gNB in the 5 G.

The method according to the embodiment is described in conjunction with embodiments described below. A 3GPP system may be an LTE system, an enhanced LTE system, or a new 5 G system. In an embodiment, an evolved NodeB (eNB) serves as a network element of an LTE access network, and a core network (CN) includes a Mobility Management Entity (MME) and a Serving GateWay (S-GW).

Figure 2:
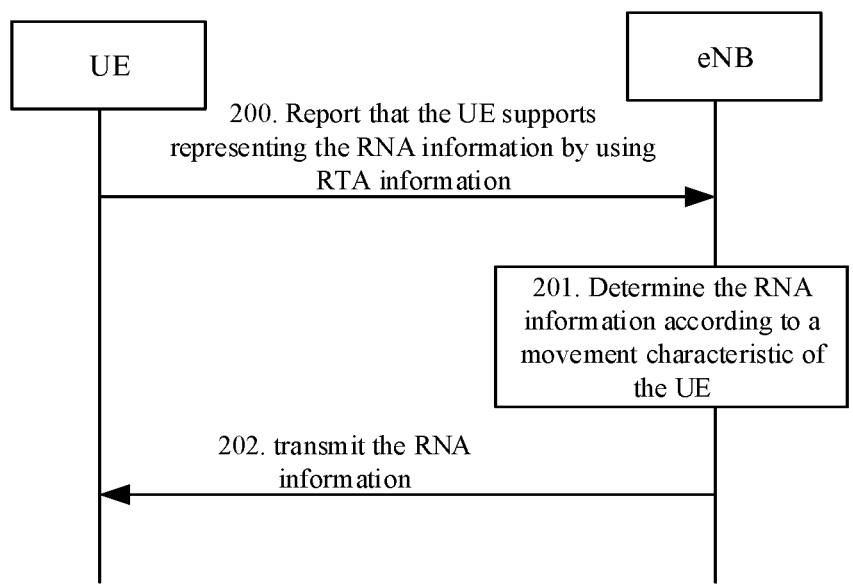
FIG. 2 is a flowchart of another method for notifying RNA information according to an embodiment.

FIG. 2 is a flowchart of a method for notifying RNA information according to an embodiment. In the embodiment, assuming that after determining RNA information according to a movement trajectory of a UE, the eNB notifies the UE of the RNA information. As shown in FIG. 2, the method includes steps described below.

In step 200, the UE reports that the UE supports representing the RNA information by using RTA information.

In the embodiment, the UE reports to the eNB an indication that the UE supports representing the RNA information by using a RTA or UE specific RTA list.

In the embodiment, assuming that a service model of the UE is eMBB service, the UE may acquire through a system information that an RTA identifier of a current cell is RTA1. It is assumed that the movement trajectory of the UE involves Cell11, Cell12 and Cell31, where Cell11 and Cell12 belong to RTA1 and Cell13 belongs to RTA2.

In step 201, the eNB determines the RNA information according to a movement characteristic of the UE.

The RNA information of the UE determined by the eNB according to the movement trajectory of the UE includes the RTA1 and the RTA2, where the RTA1 includes the Cell11 and the Cell12, and the RTA2 includes the Cell13.

In step 202, the eNB notifies the UE of the determined RNA information through a downlink air interface message.

In the embodiment, the RNA information is represented using an RTA list. For example, the RTA list includes the RTA1 and the RTA2.

FIG. 3 is a flowchart of an update of RNA information according to an embodiment. In the embodiment, RNA information is represented with RTA information. As shown in FIG. 3, an update procedure includes steps described below.

In step 300, a UE moves into an inactive state under a serving RAN node, i.e., a gNB1. In an RRC connection release message, the serving RAN node provides two parameters: a UE resume ID and an RNA within which the UE autonomously moves. Here, the RNA is represented with an RTA list.

In steps 301 and 302, the UE moves to coverage of a gNB2, reads an RTA carried in a broadcast message, a system information block 1 (SIB1), of the gNB2, and finds that the RTA is not in an RTA list stored by the UE. The UE triggers an RNA update procedure.

In step 303, since the UE is in the inactive state, the UE needs to perform an air interface resume procedure. The UE reports an RRC resume request message to the gNB2, where the RRC resume request message carries a UE ID such as the resume ID that identifies UE context, and a security check authentication parameter short mac-i.

Here, the authentication parameter short mac-i is transmitted to the gNB, and the gNB decodes whether the authentication parameter short mac-i is consistent with a parameter stored by the gNB by using a related encryption parameter and a complete algorithm.

In step 304, the gNB2 finds no stored UE context, and then the gNB2 acquires an anchor gNB, i.e., the gNB1, through the resume ID and initiates a UE context retrieve request to the gNB1. Similarly, the UE context retrieve request carries the resume ID and the short mac-i.

In step 305, the gNB1 verifies the resume ID through the short mac-i, determines no downlink data to be transmitted, and transmits a UE context retrieve response to the gNB2. The UE context retrieve response carries the UE context and an NGC indication of path switch.

In step 306, the gNB2 transmits an RRC connection resume message to the UE. The RRC connection resume message carries a new resume ID. The UE receives the message and performs a UE context activation operation.

In step 307, the UE returns an RRC connection resume complete message to the gNB2. This step may be omitted.

In step 308, the UE transmits an RNA update message to the gNB2. The RAN update message carries an RNA update reason, and also carries a data to-be-transmitted indication if uplink data exists in a buffer.

When the gNB2 receives the RNA update message, the gNB2 registers a position of the UE and allocates a new RTA list. If the data to-be-transmitted indication is true or the path switch is received, the gNB2 indicates (explicitly or implicitly) that the UE is in a connected state. If the data to-be-transmitted indication is false, the gNB2 instructs the UE to enter into the inactive state.

In step 309, the gNB 2 returns an RNA update accept message to the UE. The RNA update accept message carries the new RTA list and a state switch indication.

In step 310, the gNB2 initiates an NGC path switch request message to the NGC. The NGC path switch request message carries an identifier id of the gNB1. The NGC makes the gNB1 release the UE context at an NGC interface.

In step 311, an MME returns an NGC path switch request acknowledgement (ACK) message to the gNB2 through the NGC interface.

In step 312, the gNB2 transmits a UE context release message to the gNB1 to instruct the gNB1 to release UE air interface context.

In step 313, the gNB2 transmits an identifier of a new anchor gNB to the UE via new RRC dedicated signaling until a last packet of user plane data is received.

In step 314, when the gNB2 receives the last packet, a network side instructs the UE to enter into the inactive state.

FIG. 4 is a flowchart of another update of RNA information according to an embodiment. In the embodiment, RNA information is represented with TA information. As shown in FIG. 4, the update includes steps described below.

In step 400, assuming that a UE is in a connected state in an RRC connection process, the UE acquires a TA or a TA list via dedicated signaling and then rolls back to an inactive state. For example, an eNB1 transmits an RRC connection release message to the UE. The RRC connection release message carries the TA or the TA list.

In step 401, the UE reads, through a broadcast message of a Cell2 of an eNB2, a TA (new TA) into which the UE currently enters, which is different from the TA for representing RNA information and stored by the UE or is not in the TA list for representing the RNA information and stored by the UE.

In steps 402 and 403, the UE starts a timer and initiates an RNA update request at an RNA level to the eNB2 in a grant free manner. The request carries at least one of a TA accessed by the UE, UE movement information and UE service information, and a UE id.

The RNA update request at the RNA level is transmitted again if a response is not received in the case of a timer timeout. An RRC connection request message is initiated if no response is received when the RNA update request has been transmitted for certain times such as three times.

In step 404, the target eNB2 acquires an RNA update request message of the UE and acquires an identifier of an anchor eNB, for example, an eNB1, through the UE id when the eNB2 finds no UE context.

The reason for carrying an RNA update message is an RNA update reason value rather than an uplink data arrival request.

In step 405, the target eNB, the eNB2, transmits a UE context request or the RNA update request to the anchor eNB, i.e., the eNB1.

In step 406, the anchor eNB1 transmits a UE context response or an RNA update response to the target eNB2.

In step 407, the target eNB2 determines a new TA or TA list.

In this step, the new TA or TA list may be determined through background configuration or based on a movement characteristic of the UE such as a movement trajectory and a movement speed. An implementation manner may be referred to FIG. 1, which is not repeated herein.

In step 408, the eNB2 returns an RNA update accept message at a RAN level to the UE.

FIG. 5 is a flowchart of yet another update of RNA information according to an embodiment. In the embodiment, RNA information is represented with cell information. As shown in FIG. 5, the update includes steps described below.

In step 500, it is assumed that a UE is in a connected state in an RRC connection process and acquires a TA or TA list via dedicated signaling.

In step 501, the UE reads, through a broadcast message of an eNB2, a cell into which the UE currently enters, which is different from a cell for representing the RNA information and stored by the UE or is not in a cell list for representing the RNA information and stored by the UE.

In step 502, the UE initiates an RNA update request at a RAN level through a pre-configured common resource. The request may carry at least one of a cell accessed by the UE, UE movement information and UE service information. A specific resource may be identified by a preamble and is reserved for the UE's RAN update message at the RAN level.

In step 503, the eNB2 finds no UE context and acquires an identifier of an anchor eNB1 through a UE id.

In step 504, the eNB2 transmits the RNA update request to the eNB1. The request carries at least one of the UE id, the UE service information, the UE movement information and data address information of the eNB2.

If the eNB1 receives downlink data, the eNB1 may directly route the downlink data to the eNB2 through the data address information of the eNB2 and require the eNB2 to perform a path switch.

In step 505, the anchor eNB1 acquires the RNA update message of the UE and determines a new a cell or cell list. Here, a new TA or TA list may be determined through background configuration or based on a movement characteristic of the UE such as a movement trajectory and a movement speed. An implementation manner may be referred to FIG. 1, which is not repeated herein.

In step 506, the eNB1 returns an RNA update accept message at the RAN level to the eNB2. The RNA update accept message carries the UE id and the determined cell or cell list.

In step 507, the eNB2 transmits the preamble and the RNA update accept message at the RAN level to the UE.

If both a network side node and a terminal support representing RNA information by using cell information, that is, a cell or UE specific cell list, in a case that downlink data, an NGC interface signaling or an NAS signaling from a core network arrives, an RAN paging is performed in a cell indicated by the cell information. In response to a paging timeout, the RAN paging may be performed in an RTA list or in a TA or TA list. The RTA list and the TA list are determined according to a movement trajectory of a UE.

Figure 6:
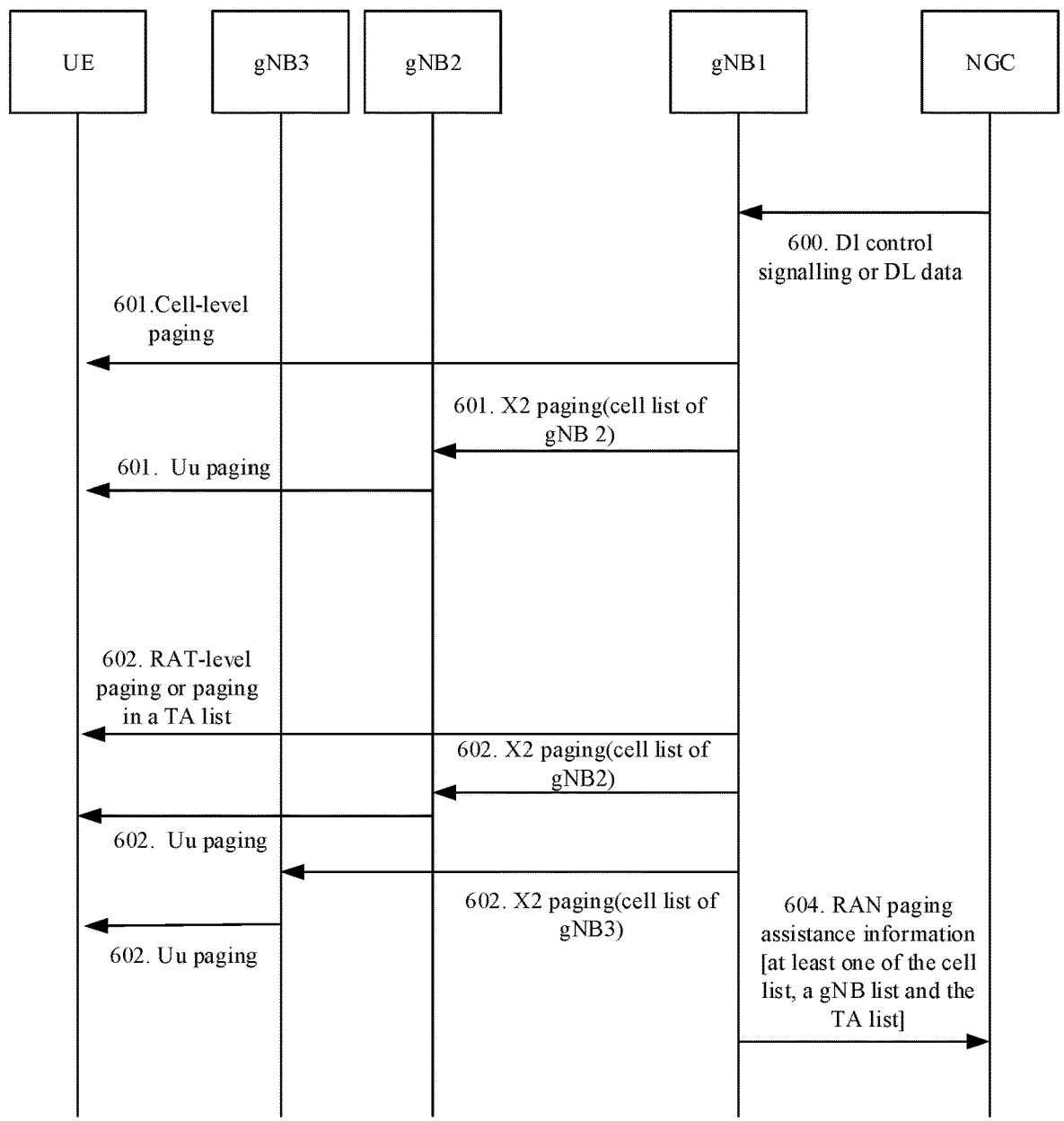
FIG. 6 is a flowchart of an RAN paging according to an embodiment.

FIG. 6 is a flowchart of an RAN paging according to an embodiment. As shown in FIG. 6, the RAN paging may include steps described below.

In step 600, a gNB1 receives downlink data or an NGC interface signaling from an MME.

In step 601, the gNB1 performs a cell-level paging.

The gNB1 acquires a current cell or UE specific cell list for representing RNA information of a UE. The gNB1 starts a paging timer and transmits a paging message to the obtained cell or UE specific cell list.

If the paging is performed across gNBs, an X2 paging message is transmitted to a related gNB. For example, in an embodiment, the gNB1 transmits the X2 paging message to a gNB2.

In step 602, assuming that the paging cannot be achieved, for example, the gNB1 still has not received a paging response in case of a paging timer timeout, the gNB1 performs an RAT-level paging or performs a paging in a TA list.

If the paging is performed across gNBs, the X2 paging message is transmitted to the related gNB. An RTA list and the TA list carried in the X2 paging message are determined according to a movement trajectory of the UE. In an embodiment, it is assumed that the gNB1 initiates the X2 paging message to the gNB2 and a gNB3.

In step 603, assuming that the paging cannot be achieved, the gNB1 learns that an NGC supports a CN-level paging for an inactive UE, and the cell list and the RTA list are mapped to the related TA list and TA.

Here, information that the NGC supports the CN-level paging for the inactive UE may be notified to the gNB1 through the NGC interface between the core network and the gNB. That the NGC supports the CN-level paging for the inactive UE may be notified specifically when a network element is powered on, or may be notified to the gNB when the UE is in a dedicated state.

In step 604, the gNB1 transmits related paging assistance information to the MME, which includes at least one of the cell list, a gNB list, the TA list and the like in step 603.

An embodiment further provides a computer-readable storage medium, arranged to store computer-executable instructions for executing any method for notifying RNA information in the foregoing embodiment.

Figure 7:
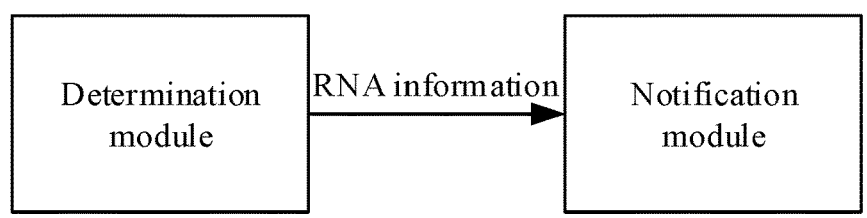
FIG. 7 is a structural diagram of a device for notifying RNA information according to an embodiment.

FIG. 7 is a structural diagram of a device for notifying RNA information according to an embodiment. As shown in FIG. 7, the device includes at least a determination module and a notification module.

The determination module is arranged to determine RNA information according to a preset strategy.

The strategy includes one of manners described below. The RNA information is represented in a default manner. For example, the RNA information is represented in a manner configured at a network side.

Alternatively, a manner for representing the RNA information is determined according to information related to a terminal. For example, the manner for representing the RNA information is determined according to the information related to the terminal such as at least one of a service characteristic, a movement characteristic and the like.

The notification module is arranged to transmit the determined RNA information to the terminal.

Optionally, the notification module is arranged to transmit an inactive indication and the determined RNA information to the terminal.

Optionally, the determined RNA information may be transmitted to the terminal through a downlink air interface message. The downlink air interface message may include, but is not limited to, a common message, a dedicated message and the like.

In a case that the strategy includes representing the RNA information in the manner configured at the network side, the determination module is arranged to perform operations described below.

The RNA information is represented by using at least one of RTA information, cell information and TA information. If a network side has no related configuration, the terminal reports an exception. In this case, the terminal in an inactive state by default supports representing the RNA information with at least one of the RTA information, the cell information and the TA information.

Alternatively, the RNA information is by default represented by using at least one of the RTA information and the cell information. If the network side has no configuration, the RNA information is by default represented by using the TA information.

Optionally, in a case that the strategy includes representing the RNA information by using the RTA information and the cell information, the determination module is further arranged to determine to represent the RNA information with one of the RTA information and the cell information according to the information related to the terminal such as at least one of the service characteristic, the movement characteristic and the like.

Optionally, the service characteristic of a UE includes a delay requirement, a reliability requirement and a rate requirement. For example, the RNA information of different area levels may be configured for different service characteristics which include at least one of a narrowband Internet of things (NB-IoT) service, an ultra reliable low latency service and an enhanced mobile broadband (eMBB) service. For example, for the NB-IoT service and the ultra reliable low latency service, the RNA information may be represented with information on a small area, such as the cell information. For example, for the eMBB service, the RNA information may be represented with information on a wide area, such as the RTA information or the TA information.

Optionally, the movement characteristic of the UE includes movement trajectory information of the UE, and the determination module is further configured to estimate a smaller paging area within a TA list according to the movement trajectory information of the UE, and determine a base station list in the smaller paging area. That is to say, for a currently configured paging area, the smaller paging area is determined by optimizing the RNA information. For example, assuming that the notified paging area of the UE includes Cell1, Cell2 and Cell3, an early paging area may be a currently registered cell, e.g., the Cell1, according to the movement characteristic such as a low speed of the UE.

Optionally, the strategy may include receiving a manner for representing RNA information that is supported by the terminal and reported by the terminal, and the network side node configures the RNA information of the terminal in the inactive state according to the manner for representing the RNA information that is supported by the terminal.

The cell information may include information on a cell or UE specific cell list. Range of the UE specific cell list includes at least one of the following: multiple cells belong to one or multiple base stations, and multiple cells belong to one or multiple TAs.

The RTA information may include information on an RTA or UE specific RTA list.

The TA information may include information on a TA or TA list.

Optionally, the manner for representing the RNA supported by the terminal includes at least one of: representing the RNA information by using the cell information; and representing the RNA information by using the TA information.

Optionally, the RNA information may be one of the following:

one cell belongs to one RTA;
one cell belongs to multiple RTAs for different services;
one RTA may include one or multiple cells;
the multiple cells included in one RTA may belong to one or multiple base stations;
the multiple cells included in one RTA may belong to one or multiple TAs; and
the multiple cells included in one RTA should be in one TA list.

Optionally, in a case that the strategy includes multiple manners for representing the RNA information, the determination module is further arranged to determine one manner, according to the information related to the terminal such as at least one of the service characteristic, the movement characteristic and the like, to represent the RNA information.

The device for acquiring RNA information provided by the embodiment may be disposed in a base station, or disposed as an independent apparatus.

Optionally, in a case that the terminal finds that it enters into a new RNA, the terminal initiates a RAN-side RNA update procedure, which may include one of the three types described below:

an RNA update procedure where the RNA information is represented by the RTA information;
an RNA update procedure where the RNA information is represented by the TA information;
and an RNA update procedure where the RNA information is represented by the cell information.

Optionally, in a case that both a network element to which the device in the embodiment belongs and the terminal support representing the RNA information by using the cell information, the device further includes an optimization module.

The optimization module is arranged to perform an RAN paging in a cell indicated by the cell information in a case that downlink data, an NGC interface signaling or an NAS signaling is received from a core network.

In response to a paging timeout, the optimization module is further arranged to perform an RAN paging in a TA indicated by the RTA information or the TA information. The TA indicated by the RTA information or the TA information is determined by a movement trajectory of the terminal.

What is claimed is:

1. A communication method, comprising:
   determining, by a communication node, radio access network-based notification area (RNA) information represented by RAN tracking area (RTA) information and tracking area (TA) information;
   transmitting, by the communication node, the determined RNA information to the communication device;
   determining, by the communication node, a failure to perform a paging based on the RNA information; and
   transmitting, by the communication node, paging assistance information to a core network, wherein the paging assistance information is used by the core network for CN-level paging to the communication device, and the paging assistance information comprises a cell list and a TA list.

2. The communication method of claim 1, wherein the RTA information comprises information regarding an RTA or an RTA list.

3. The communication method of claim 1, wherein the RNA information is further represented by cell information that comprises information regarding a cell or a second cell list.

4. The communication method of claim 1, wherein the TA information comprises information regarding a TA or a second TA list.

5. The communication method of claim 1, further comprising:
   configuring, by the communication node for the communication device, an inactive indication based on the RNA information; and
   transmitting, by the communication node, the inactive indication to the communication device.

6. The communication method of claim 1, wherein the determined RNA information is transmitted to the communication device via a downlink air interface message.

7. The communication method of claim 6, wherein the downlink air interface message includes one of a common message or a dedicated message.

8. The communication method of claim 1, further comprising:
   receiving, by the communication node, a request to update the determined RNA information, in response to the communication device determining that an area into which the communication device enter is different from an area indicated in the determined RNA information.

9. The communication method of claim 1, further comprising:
   receiving, by the communication node, a request to update the determined RNA information, in response to the communication device determining that a cell into which the communication device enters is different from a cell indicated in the determined RNA information or not included in a second cell list indicated in the determined RNA information.

10. The communication method of claim 1, further comprising:
    receiving, by the communication node, a request to update the determined RNA information, in response to the communication device determining that an RTA that the communication device receives is not included in an RTA list indicated in the determined RNA information.

11. The communication method of claim 1, further comprising:
    receiving, by the communication node, a request to update the determined RNA information, in response to the communication device determining that a TA into which the communication device enters is different from a TA indicated in the determined RNA information or not included in a second TA list indicated in the determined RNA information.

* * * * *